US010641492B2

(12) United States Patent
Tsunoda et al.

(10) Patent No.: US 10,641,492 B2
(45) Date of Patent: May 5, 2020

(54) COMBUSTOR AND GAS TURBINE

(71) Applicant: MITSUBISHI HITACHI POWER SYSTEMS, LTD., Kanagawa (JP)

(72) Inventors: Naoki Tsunoda, Tokyo (JP); Satoshi Takiguchi, Tokyo (JP); Shinji Akamatsu, Yokohama (JP); Koichi Nishida, Yokohama (JP); Katsunori Tanaka, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 378 days.

(21) Appl. No.: 15/512,786

(22) PCT Filed: Sep. 18, 2015

(86) PCT No.: PCT/JP2015/076703
§ 371 (c)(1),
(2) Date: Mar. 20, 2017

(87) PCT Pub. No.: WO2016/047601
PCT Pub. Date: Mar. 31, 2016

(65) Prior Publication Data
US 2017/0284672 A1  Oct. 5, 2017

(30) Foreign Application Priority Data

Sep. 25, 2014  (JP) ................ 2014-195035

(51) Int. Cl.
*F02C 1/00* (2006.01)
*F23R 3/04* (2006.01)
(Continued)

(52) U.S. Cl.
CPC ............. *F23R 3/04* (2013.01); *F01L 9/023* (2013.01); *F02C 7/18* (2013.01); *F23R 3/08* (2013.01);
(Continued)

(58) Field of Classification Search
CPC .. F01D 9/023; F23R 3/002; F23R 3/16; F23R 3/42; F23R 3/46; F23R 3/48;
(Continued)

(56) References Cited

U.S. PATENT DOCUMENTS 3,420,058 A  1/1969 Howald et al.
4,413,477 A *  11/1983 Dean ................ F23R 3/002
60/757

(Continued)

FOREIGN PATENT DOCUMENTS

JP  2004-156860  6/2004
JP  4709433  6/2011
WO  2014/141825  9/2014

OTHER PUBLICATIONS

International Search Report dated Nov. 24, 2015 in International Application No. PCT/JP2015/076703 (with English translation).

(Continued)

*Primary Examiner* — Gerald L Sung
(74) *Attorney, Agent, or Firm* — Wenderoth, Lind & Ponack, L.L.P.

(57) ABSTRACT

A combustor including a transition piece that defines a flow channel therein; a combustor basket inserted in the transition piece from an upstream side of the flow channel that sends a combustion gas through the flow channel and defines a gap through which a compressed air is sent with an inner peripheral surface of the transition piece; wherein the combustor basket includes a notch portion recessed from an end of the combustor basket on a downstream side toward the upstream side, and a purge air introduction hole through which the compressed air in the gap is introduced into the notch portion.

8 Claims, 5 Drawing Sheets

(51) Int. Cl.
*F02C 7/18* (2006.01)
*F23R 3/08* (2006.01)
*F23R 3/48* (2006.01)
*F01L 9/02* (2006.01)
*F23R 3/60* (2006.01)
*F23R 3/42* (2006.01)

(52) U.S. Cl.
CPC .................. *F23R 3/48* (2013.01); *F23R 3/60* (2013.01); *F23R 3/42* (2013.01)

(58) Field of Classification Search
CPC .. F23R 2900/03041; F23R 2900/03042; F02C 7/18
See application file for complete search history.

(56) References Cited

U.S. PATENT DOCUMENTS

| | | | | |
|---|---|---|---|---|
| 5,402,635 | A * | 4/1995 | Smith | F23R 3/48 60/39.37 |
| 6,220,015 | B1 * | 4/2001 | Mina | F23R 3/48 60/39.37 |
| 7,032,386 | B2 | 4/2006 | Mandai et al. | |
| 2003/0188537 | A1 * | 10/2003 | Martling | F23R 3/48 60/800 |
| 2012/0198854 | A1 | 8/2012 | Schilp et al. | |
| 2013/0160453 | A1 | 6/2013 | Kimura et al. | |
| 2015/0377032 | A1 * | 12/2015 | Lewis | F01D 9/023 60/755 |
| 2016/0003481 | A1 * | 1/2016 | Taniguchi | F23R 3/42 60/737 |
| 2016/0201908 | A1 * | 7/2016 | Drake | F23R 3/002 60/782 |
| 2016/0305325 | A1 * | 10/2016 | Cunha | F02C 7/266 |

OTHER PUBLICATIONS

Written Opinion of the International Searching Authority dated Nov. 24, 2015 in International Application No. PCT/JP2015/076703 (with English translation).

* cited by examiner

COMBUSTOR AND GAS TURBINE

TECHNICAL FIELD

The present invention relates to a combustor and a gas turbine provided with the same.

This application claims priority based on Japanese Patent Application No. 2014-195035 filed in Japan on Sep. 25, 2014, of which the contents are incorporated herein by reference.

BACKGROUND ART

A gas turbine includes a compressor that generates compressed air, a combustor that combusts fuel in the compressed air to generate combustion gas, and a turbine that is driven in rotation by the combustion gas. The combustor includes a combustor basket where fuel and air are supplied and a transition piece where combustion gas is generated after the fuel and air supplied to the combustor basket are ignited therein.

In some conventional gas turbines (for example, see Patent Document 1), film air is supplied from a gap between the outer ring of the outlet that composes a leading end portion of the combustor basket and the transition piece to prevent the combustion gas generated in the transition piece from damaging the internal wall surface of the transition piece.

It is common for actual gas turbines to have a configuration with a plurality of combustors disposed around the periphery of the gas turbine and these combustors being connected via a connecting pipe. In such a configuration, one combustor is provided with an ignition plug, and the flame produced in this combustor can then spread to other combustors via the connecting pipe to ignite all of the combustors. When combustors are provided with a connecting pipe as such, specifically, an opening is formed in the wall of the combustor basket of the combustor, and adjacent combustors are connected at the opening via the connecting pipe. Additionally, at the region near the opening, the combustion gas or flames flowing through the connecting pipe can be prevented from interfering with the combustor basket via a notch portion.

CITATION LIST

Patent Document

Patent Document 1: Japanese Patent No. 44709433B

SUMMARY OF INVENTION

Technical Problem

However, the combustor with the configuration described above may have problems in having a uniform flow of film air through the combustor basket. In particular, in the technology described in Patent Document 1, at the region near where the connecting pipe is connected, the flow of the film air is impeded by the connecting pipe, thus causes the film air to separate. Additionally, the combustion gas may remain in the notch portion, causing flames to be generated in undesired regions. Thus, the combustor may be damaged.

Solution to Problem

A first aspect of the present invention is a combustor comprising a transition piece that defines a flow channel therein; a combustor basket inserted in the transition piece from an upstream side of the flow channel that sends a combustion gas through the flow channel and defines a gap through which a compressed air is sent with an inner peripheral surface of the transition piece; wherein the combustor basket includes a notch portion recessed from an end of the combustor basket on a downstream side toward the upstream side, and a purge air introduction hole through which the compressed air in the gap is introduced into the notch portion.

According to this configuration, a purge air introduction hole is provided, thus allowing the compressed air acting as a purge air flow to be guided inside the notch portion. By supplying the purge air flow, the combustion gas can be prevented from remaining inside the notch portion and flames can be prevented from being generated via the ignition of this combustion gas.

A second aspect of the present invention is the combustor according to the first aspect, wherein the combustor basket includes a protruding portion formed along an edge of the notch portion that protrudes in a direction away from the flow channel, and the purge air introduction hole is a through-hole that passes through the protruding portion.

According to this configuration, by providing the through-hole that passes through the protruding portion as the purge air introduction hole, the compressed air acting as the purge air flow can be more reliably guided inside the notch portion.

A third aspect of the present invention is the combustor according to the second aspect, wherein the through-hole decreases in inner diameter dimension from the upstream side toward the downstream side.

According to this configuration, the inner diameter dimension of the through-hole decreases from the upstream side toward the downstream side, which allows the flow velocity of the purge air flow on the downstream side to be regulated appropriately to a higher velocity.

A fourth aspect of the present invention is the combustor according to the second or third aspect, wherein the through-hole increases in inner diameter dimension from the upstream side toward the downstream side.

According to this configuration, the inner diameter dimension of the through-hole increases from the upstream side toward the downstream side, which allows the flow velocity of the purge air flow on the downstream side to be regulated appropriately to a lower velocity.

A fifth aspect of the present invention is the combustor according to any one of the second to fourth aspects, wherein the purge air introduction hole is a plurality of the through-holes.

According to this configuration, the plurality of through-holes are provided as purge air introduction holes. Thus, the purge air flow can be guided toward inside the notch portion in a wider region.

A sixth aspect of the present invention is a gas turbine, comprising a plurality of combustors according to any one of the above aspects, wherein the plurality of combustors are connected via a connecting pipe with a shape that corresponds to the notch portion.

According to this configuration, interference between the connecting pipe that connects the combustors and the combustor basket can be avoided and the purge air flow can be sufficiently dispersed in the region where the connecting pipe is provided.

Advantageous Effects of Invention

According to the combustor and the gas turbine described above, the chance of damage to the combustor can be effectively reduced.

DESCRIPTION OF EMBODIMENTS

A first embodiment of the present invention will be described below with reference to the drawings.

Figure 1:
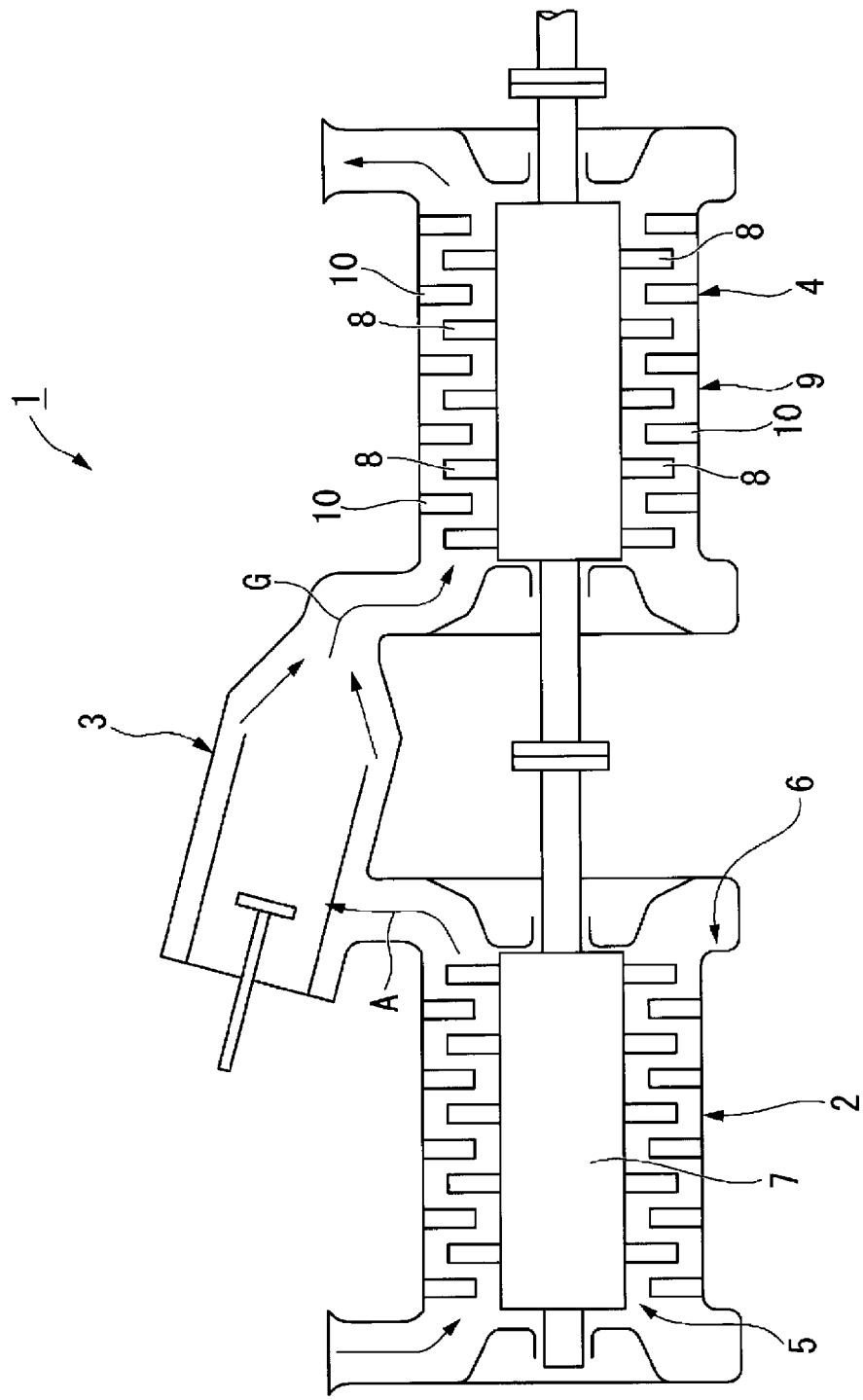
FIG. 1 is schematic diagram of a gas turbine according to an embodiment of the present invention.

As illustrated in FIG. 1, a gas turbine 1 according to the present embodiment includes a compressor 2 that compresses air taken in to the compressor 2 in large volumes, a combustor 3 that combusts a mixture of compressed air A generated at the compressor 2 and fuel, and a turbine 4 that converts thermal energy of a combustion gas G introduced from the combustor 3 into rotational energy.

The compressor 2 and the turbine 4 each include a rotor 5 and a stator 6 that covers the outer peripheral side of the rotor 5. The rotors 5 are connected to rotate as a single body. The rotor 5 includes a rotating shaft 7 and a plurality of annular blade assemblies 8 fixed at intervals in the axial line O direction. The annular blade assemblies 8 each include a plurality of blades fixed on the periphery of the rotating shaft 7 at intervals in the circumferential direction.

The stator 6 includes a casing 9 and a plurality of annular vane assemblies 10 fixed inside the casing 9 at intervals in the axial line O direction. The annular vane assemblies 10 each include a plurality of vanes fixed on the inner surface of the casing 9 at intervals in the circumferential direction.

The annular vane assemblies 10 and the annular blade assemblies 8 are alternately arranged in the axial line O direction.

Figure 2:
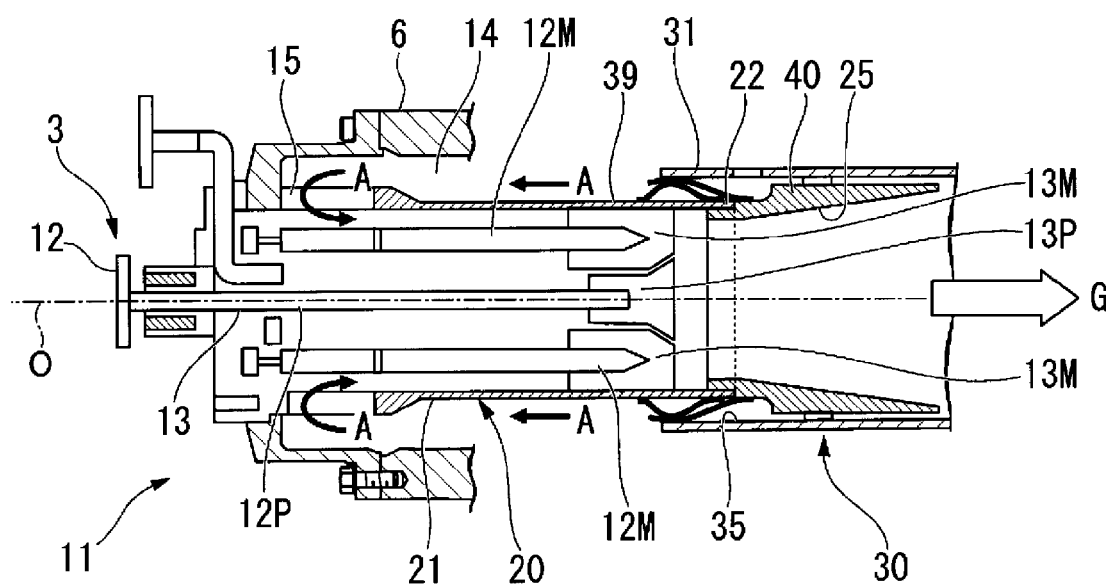
FIG. 2 is a schematic diagram of a cross section of a combustor according to the embodiment of the present invention as viewed from a direction orthogonal to the axial line of the combustor.

As illustrated in FIG. 2, the combustor 3 includes a fuel supply unit 11 that sprays compressed air A from the compressor 2 and fuel, a combustor basket 20 where the compressed air A and the fuel from the fuel supply unit 11 are supplied to, and a transition piece 30 through which the combustion gas G generated from the compressed air A and the fuel sent from the combustor basket 20 is sent to the turbine 4. The combustor basket 20 and the transition piece 30 of the combustor 3 are both disposed within the casing 14 of the turbine 4.

In the present embodiment, a plurality of combustors 3 are disposed around the periphery of the casing 9 of the gas turbine 1. The plurality of combustors are connected via a connecting portion C. One combustor of the plurality of combustors 3 is provided with an ignition plug, and the flame produced in this combustor is then spread to other combustors via the connecting portion C to ignite all of the combustors.

The combustor basket 20 includes an cylindrical combustor basket main body portion 39 disposed on one side of the combustor basket 20 and an annular outlet outer ring 40 disposed on the other side of the combustor basket 20. The fuel supply unit 11 is disposed on one end of the combustor basket 20, and an opening 25 is formed on the other end. The outlet outer ring 40 forms the leading end of the combustor basket 20.

Note that in the description below, one end of the combustor basket main body portion 39 is defined as a base end portion 21, the other end is defined as a leading end portion 22, the base end portion 21 side is defined as the upstream side, and the leading end portion 22 side is defined as the downstream side. Additionally, a direction of the axial line O of the combustor basket 20 is defined as the axial line direction, the circular direction about the axial line O is defined as the circumferential direction, and the radial direction of this circle is defined as the radial direction.

The transition piece 30 is a part with a tubular shape like that of the combustor basket 20. The inside of the transition piece 30 is hollow from one end to the other, and an opening 35 is formed at one end. The inner diameter of the opening 35 is larger than the outer diameter of the leading end portion 22 and the outlet outer ring 40 of the combustor basket 20. Note that below, the end on the upstream side of the transition piece 30 is defined as a base end portion 31. The leading end portion 22 and the outlet outer ring 40 of the combustor basket main body portion 39 are inserted in the base end portion 31 of the transition piece 30. The downstream end of the transition piece 30 is connected to a combustion flow path of the turbine 4.

The fuel supply unit 11 is fixed to the casing 9. The base end portion 21 of the combustor basket 20 is supported by the fuel supply unit 11. Additionally, the leading end portion 22 of the combustor basket main body portion 39 is supported by the base end portion 31 of the transition piece 30 and a non-illustrated support part provided on the casing 9.

The fuel supply unit 11 includes a pilot burner 12P and a plurality of main burners 12M. The pilot burner 12P is provided on the axial line O of the combustor 3. The pilot burner 12P sprays supplied fuel from a pilot nozzle 13P. A flame is generated by the ignition of the fuel sprayed from the pilot nozzle 13P.

Though no detailed drawing is provided, a pilot cone is provided on the pilot burner 12P. The pilot cone is a tubular part that covers the outer peripheral side of the pilot nozzle 13P. The pilot cone is provided to increase the flame stability by regulating the diffusion region and direction the flames.

Additionally, the plurality of main burners 12M are provided on the inner side of the combustor basket 20. Specifically, the plurality of main burners 12M are arranged at equal intervals in the circumferential direction on the outer peripheral side of the pilot burner 12P. The main burners 12M each extend along the axial line O of the combustor basket 20. In other words, the main burners 12M are each parallel with the pilot burner 12P.

A main nozzle 13M is provided on the leading end portion of the main burner 12M. Fuel is sprayed from a non-illustrated fuel nozzle at the main burner 12M configuration as such. The sprayed fuel mixes with the compressed air A inside the combustor basket 20 to generate a premixed gas. The premixed gas is ignited by the flames formed at the pilot burner 12P and premixed diffusion flames are generated inside the transition piece 30. The combusted premixed gas then flows toward the turbine 4 as the combustion gas G.

Figure 3:
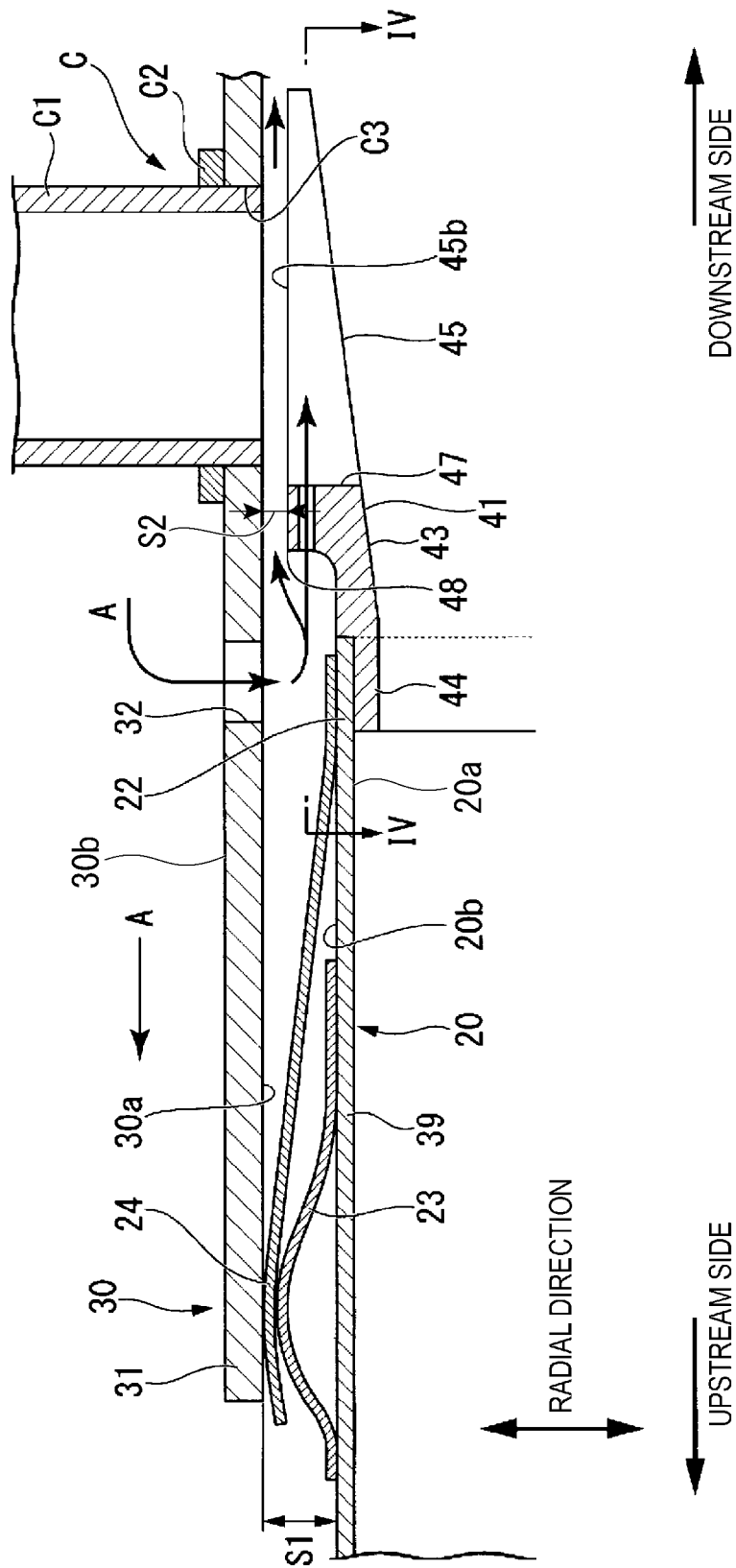
FIG. 3 is a cross-sectional view illustrating a main portion of the combustor according to the embodiment of the present invention. A connecting portion of a combustor basket and a transition piece is illustrated.

Additionally, as illustrated in FIG. 3, at the connecting portion (fit allowance) of the combustor basket 20 and the transition piece 30, a gap S1 is formed between the outer peripheral surface 20b of the combustor basket main body portion 39 and the inner peripheral surface 30a of the transition piece 30 to allow expansion and deformation of the combustor basket 20 and the transition piece 30 due to heat. On the outer peripheral surface 20b near the leading end portion 22 of the combustor basket main body portion 39, a flat spring 23 and a seal member 24 supported by the flat spring 23 are provided to seal the gap S1.

The seal member 24 is a tubular thin member for sealing the connecting portion of the combustor basket 20 and the transition piece 30. A plurality of slits (not illustrated) are formed in the circumferential direction around the seal member 24. The outer peripheral surface of the seal member 24 on the upstream side is in contact with the inner peripheral surface 30a of the transition piece 30, and the inner peripheral surface on the downstream side fits with the outer peripheral surface 20b of the combustor basket main body portion 39.

The flat spring 23 is an elastic member that biases the upstream side of the seal member 24, from radially inward to outward, toward the inner peripheral surface 30a of the transition piece 30. The flat spring 23 has a tubular shape similar to that of the seal member 24.

The outlet outer ring 40 connected to the leading end portion 22 of the combustor basket main body portion 39 includes a tubular main body portion 41 and a fixing member (not illustrated) for fixing the main body portion 41 to the combustor basket main body portion 39 in a non-detachable manner.

Additionally, on the inner peripheral side of the main body portion 41, a tapered-shaped expanding surface 43 is formed that gradually expands toward the downstream side. The expanding surface 43 allows the compressed air A and the fuel to be smoothly supplied from the combustor basket 20 to the transition piece 30.

The main body portion 41 of the outlet outer ring 40 includes a fitting portion 44 that fits with the leading end portion 22 of the combustor basket main body portion 39 and a contracting portion 45 in that order from the upstream side. The fitting portion 44 has a shape allowing it to fit with the inner peripheral surface 20a of the leading end portion 22 of the combustor basket main body portion 39 without any gaps. In other words, the outer diameter dimension of the fitting portion 44 is set to be smaller than the inner diameter dimension of the leading end portion 22 of the combustor basket main body portion 39. Additionally, a gap in the radial direction is provided is provided between the outer peripheral surface 45b of the contracting portion 45 and the inner peripheral surface 30a of the transition piece 30.

The gas turbine 1 according to the present embodiment includes a plurality of combustor 3 disposed at intervals around the periphery of the casing 9. The plurality of combustors 3 are connected to one another via the connecting portion C. In other words, the flames generated at one combustor 3 spreads to other adjacent combustors 3 through the connecting portion C. Accordingly, by the flames spreading to all of the combustors 3 arranged in the circumferential direction, the combustion gas G is supplied with a uniform temperature distribution throughout the turbine 4.

The connecting portion C includes a connecting pipe C1, which is a pipe part that connects two adjacent combustors 3, 3, and a fixing portion C2 where the connecting pipe C1 is fixed to the combustor 3.

The outer diameter of the connecting pipe C1 is approximately identical to that of a connection hole C3 provided on the outer wall of the transition piece 30 of the combustor 3. Adjacent combustors 3, 3 are connected by connecting the end of the connecting pipe C1 to the connection hole C3. Additionally, the connecting pipe C1 and the connection hole C3 are fixed together in a non-detachable manner via the fixing portion C2. The configuration of the fixing portion C2 is not illustrated in detail, however the fixing portion C2 may be fastened together via a screw, for example. Additionally, a seal member or the like may be provided to suppress leakage of the combustion gas G flowing therethrough.

Furthermore, in the combustor 3 according to the present embodiment, in the region near the base end portion 31 of the transition piece 30, a plurality of air supply holes 32 are formed all around the transition piece 30 in the circumferential direction. The air supply holes 32 are located relative to the axial direction on the downstream side of the seal member 24 when the transition piece 30 and the combustor basket 20 are assembled.

Figure 4:
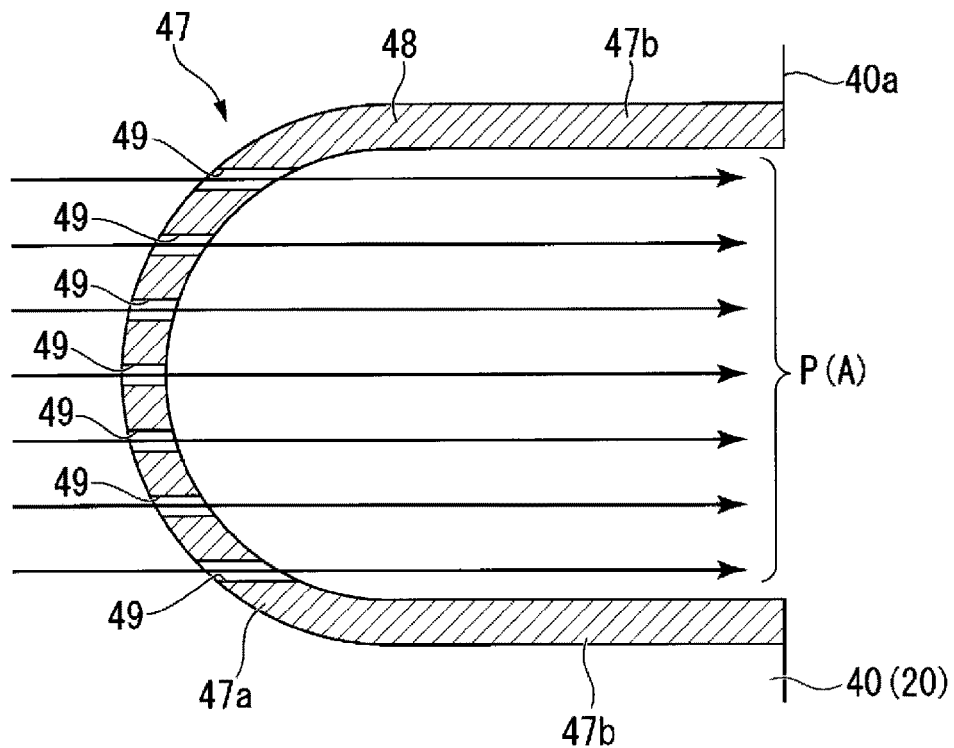
FIG. 4 is a cross-sectional view of the connecting portion of the combustor basket and the transition piece of the combustor according to the embodiment of the present invention as viewed from the circumferential direction (cross-sectional view taken along line IV-IV in FIG. 3).

In the combustor 3 configured as described above, because the end of the connecting pipe C1 reaches to the inside of the transition piece 30, it is necessary for interference between the combustion gas and flames flowing through the connecting pipe C1 and the outlet outer ring 40 to be avoided. For this reason, as illustrated in FIGS. 3 and 4, a notch portion 47 is formed on the outlet outer ring 40 with a shape that corresponds to the connecting pipe C1.

The notch portion 47 is recessed from a downstream edge 40a of the outlet outer ring 40 toward the upstream side. Specifically, as illustrated in FIG. 4, the notch portion 47 includes an arcuate portion 47a with an arcuate shape, and linear portions 47b with a rectilinear shape that connect the opposite ends of the arcuate portion 47a to the downstream edge 40a of the outlet outer ring 40. The dimension in the radial direction of the arcuate portion 47a is sufficiently larger than the outer diameter dimension of the connecting pipe C1. The region thus made between the arcuate portion 47a and the connecting pipe C1 is defined as a gap S2.

Returning to the FIG. 3, when viewed from a direction orthogonal to the axial line O, a protruding portion 48 is formed on the downstream edge 40a of the outlet outer ring 40. The protruding portion 48 protrudes in a step-like manner in the direction away from the outer peripheral surface of the main body portion 41 of the outlet outer ring 40, or in other words radially outward.

A plurality of purge air introduction holes 49 (through-holes 49) are formed in the protruding portion 48. The purge air introduction holes 49 are aligned with the axial line O direction so as to pass through the protruding portion 48. In the present embodiment, a plurality (seven) purge air introduction holes 49, 49, 49, 49, 49, 49, 49 are provided parallel to one another on the arcuate portion 47a of the notch portion 47.

Next, the operation of the gas turbine 1 according to the present embodiment is explained. In the gas turbine 1, the compressed air A compressed at the compressor 2 flows through a flow channel 14 (see FIG. 2) defined by the outer peripheral surface 30b of the transition piece 30 and an outer peripheral surface 20b of the combustor basket 20 and the inner peripheral surface of the casing 9. The compressed air A is then inverted at an inverting portion 15 before entering the combustor basket 20.

Next, the fuel and compressed air A supplied from the pilot burner 12P and main burner 12M of the fuel supply unit 11 is supplied from the combustor basket 20 to the transition piece 30. The fuel and compressed air A supplied from the combustor basket 20 ignites inside the transition piece 30. Specifically, the supplied pilot fuel and the compressed air A are ignited by the pilot burner 12P to generate a diffusion flame. Additionally, by igniting the premixed gas generated from the main fuel and the compressed air A premixed at the plurality of main burners 12M, a premixed flame is generated.

The combustion gas G generated by the combustion of the pilot fuel and the main fuel is sent from the transition piece 30 into a turbine gas flow channel (not illustrated). The combustion gas G that enters the turbine gas flow channel drives the rotor 5 in rotation as described above.

As illustrated in FIG. 3, the compressed air A is also taken in to the space between the transition piece 30 and the combustor basket 20 through the air supply hole 32. The introduced compressed air A is sent from the gap between the transition piece 30 and the contracting portion 46 of the outlet outer ring 40 along the inner peripheral surface 30a of the transition piece 30.

A portion of the compressed air A sent through the transition piece 30 forms a thin film (layer of air) on the inner peripheral surface 30a of the transition piece 30. The film of compressed air A film-cools the inner peripheral surface 30a of the transition piece 30. Such film cooling protects the transition piece 30 from the radiant heat generated by the ignition of the fuel and compressed air A supplied from the opening 25 of the combustor basket 20. Note that the compressed air A not used for film cooling is mainly used as combustion air.

Here, the behavior of the compressed air A in the region near the notch portion 47 will be described with reference to FIG. 4. As illustrated in FIG. 4, when viewed from the axial line direction of the connecting pipe C1 (circumferential direction of the combustor basket 20, transition piece 30), the compressed air A flows as a purge air flow P at the region near the notch portion 47. The purge air flow P is guided from the plurality of purge air introduction holes 49 provided on the protruding portion 48 of the notch portion 47 toward the inner side of the notch portion 47 (the enclosed region inside the notch portion 47).

By supplying the purge air flow P to the notch portion 47 in such a manner, the chance of film air (compressed air A), for example, remaining in the region on the inner side of the notch portion 47 can be reduced. If the purge air introduction holes 49 are not provided and the purge air flow P is not supplied, film air can remain on the inner side of the notch portion 47 and cause a vortex flow. When flame generated inside the transition piece 30 come into contact with this vortex flow, the flames become stable in this region. This can result in damage and deterioration of the downstream edge 40a of the outlet outer ring 40 and the like.

However, in the combustor 3 according to the present embodiment, the purge air introduction holes 49 are formed on the outlet outer ring 40 as described above. Thus, the chances of flame stabilizing on the inner side of the notch portion 47 can be reduced. Thus, damage and deterioration of the combustor 3 can be suppressed.

Additionally, in the combustor 3 according to the present embodiment, as the purge air introduction holes 49, the through-holes 49 are provided passing through the protruding portion 48 provided on the notch portion 47 in the upstream-downstream direction. Thus, the compressed air A acting as the purge air flow P can be more reliably guided inside the notch portion 47.

Furthermore, according to the configuration described above, the plurality of through-holes 49 are provided as purge air introduction holes 49. Thus, the purge air flow P can be guided toward inside the notch portion 47 in a wider region.

The embodiment of the present invention has been described above in detail with reference to the drawings, but the specific configurations are not limited to the embodiment, and design changes and the like that do not depart from the scope of the present invention are also included.

For example, in the present embodiment, the shape of the opening of the purge air introduction holes 49 (through-holes 49) is not particularly limited and may have a circular cross section, an elliptical cross section, a polygonal cross section, or the like.

Figure 5:
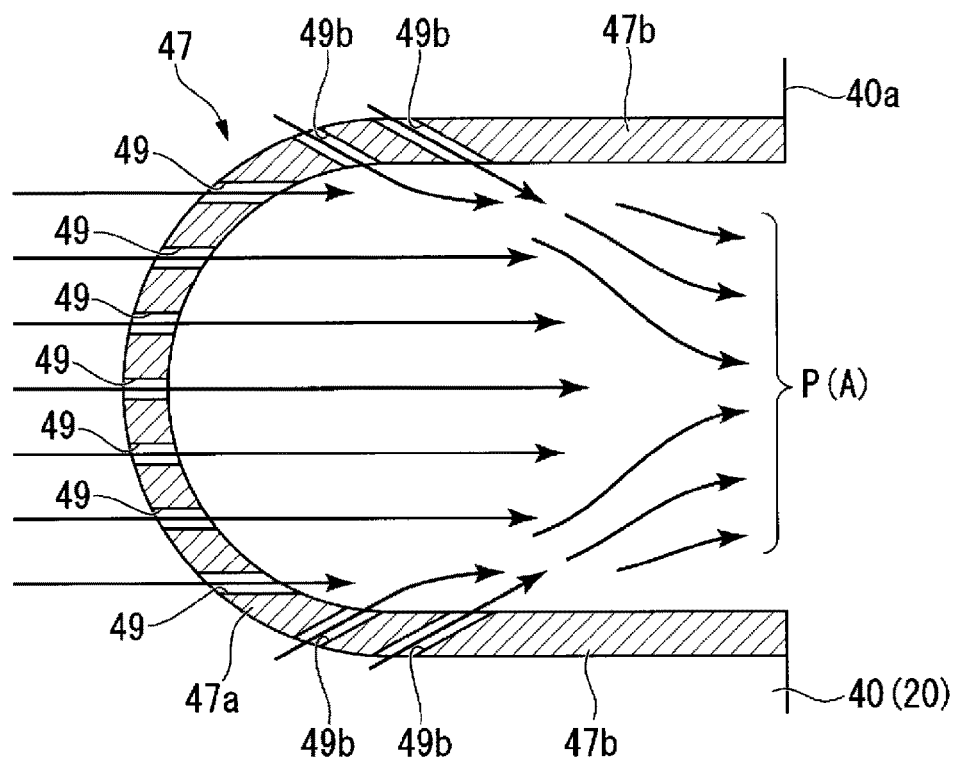
FIG. 5 is a diagram illustrating a modified example of the combustor according to the embodiment of the present invention.

Additionally, in the present embodiment, the purge air introduction holes 49 (through-holes 49) are provided on the arcuate portion 47a of the notch portion 47. However, the position of the purge air introduction holes 49 is not limited thereto. For example, as illustrated in FIG. 5, the purge air introduction holes 49 may be provided on the linear portions 47b of the notch portion 47.

Such a configuration can further reduce the chance of film air (compressed air A) remaining on the inner side of the notch portion 47.

Additionally, in the embodiment described above, the opening size of the inside of the purge air introduction holes 49 from the upstream side to the downstream side is constant. However, the opening size of the purge air introduction holes 49 is not limited thereto. For example, the opening size may gradually increase or decrease from the upstream side to the downstream side.

In configurations in which the purge air introduction holes 49 increase in inner diameter dimension from the upstream side toward the downstream side, the flow velocity of the purge air flow P on the downstream side of the notch portion 47 can be regulated appropriately lower.

Alternatively, in configuration in which the purge air introduction holes 49 decrease in inner diameter dimension from the upstream side to the downstream side, the flow velocity of the purge air flow P can be regulated appropriately higher.

Additionally, in the embodiment described above, the compressed air A used in the film cooling is sent through the air supply hole 32. However, how the compressed air A is introduced is not limited thereto, and another mode can be employed. For example, the compressed air A may be introduced from a slit formed on the seal member 24.

Figure 6:
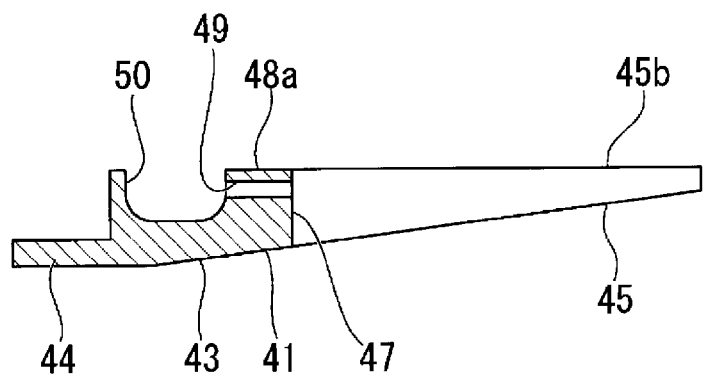
FIG. 6 is a diagram illustrating a modified example of the combustor according to the embodiment of the present invention.

Additionally, in the outlet outer ring 40 according to the present embodiment, the purge air introduction holes 49 are provided passing through the protruding portion 48 provided on the notch portion 47. However, as illustrated in FIG. 6, in a configuration in which a recessed portion 50 is provided on the outer peripheral surface of the outlet outer ring 40 as well as the purge air introduction holes 49, the purge air introduction holes 49 may be provided passing through one of the walls in the upstream-downstream direction of the recessed portion 50 and the notch portion 47.

Such a configuration can prevent the film air from remaining at the notch portion 47, and can further reduce the chance of the flow of the compressed air A acting as film air being impeded.

Additionally, in the embodiment described above, the purge air introduction hole 49 are through-holes 49. However, the configuration of the purge air introduction holes 49 is not limited thereto. For example, the purge air introduction holes 49 may be a plurality of slit-like grooves orientated from the outer peripheral surface of the outlet outer ring 40 radially inward. Such a configuration can achieve the same effect as the above configurations while also improving processability.

INDUSTRIAL APPLICABILITY

According to the combustor and the gas turbine described above, the chance of damage to the combustor can be effectively reduced.

REFERENCE SIGNS LIST

1 Gas turbine
2 Compressor
3 Combustor
4 Turbine
5 Rotor
6 Stator
7 Rotating shaft
8 Annular blade assembly
9 Casing
10 Annular vane assembly
11 Fuel supply unit
12P Pilot burner
12M Main burner
13P Pilot nozzle
13M Main nozzle
20 Combustor basket
20a Inner peripheral surface
20b Outer peripheral surface
21 Base end portion
22 Leading end portion
23 Flat spring
24 Seal member
25 Opening
30 Transition piece
30a Inner peripheral surface
30b Outer peripheral surface
31 Base end portion
32 Air supply hole
35 Opening
39 Combustor basket main body portion
40 Outlet outer ring
41 Main body portion
43 Expanding surface
44 Fitting portion
45b Outer peripheral surface
46 Contracting portion
47 notch portion
A Compressed air
C Connecting portion
C1 Connecting pipe
C2 Fixing portion
C3 Connection hole
G Combustion gas
S1 Gap
S2 Gap

The invention claimed is:

1. A combustor comprising:
a transition piece that defines a flow channel therein;
a combustor basket inserted in the transition piece from an upstream side of the flow channel that sends a combustion gas through the flow channel and defines a gap through which a compressed air is sent between an inner peripheral surface of the transition piece and the combustor basket; wherein
the combustor basket includes
a notch portion recessed from an end of the combustor basket on a downstream side toward the upstream side and having a shape that corresponds to a connecting pipe that opens along the inner peripheral surface of the transition piece, and
a purge air introduction hole through which the compressed air in the gap is directly introduced into the notch portion,
wherein the purge air introduction hole includes a plurality of first through-holes, and
wherein the plurality of first through-holes are provided along an axial direction of the combustor.

2. The combustor according to claim 1, wherein
the combustor basket includes a protruding portion formed along an edge of the notch portion that protrudes in a direction away from the flow channel, and the plurality of first through-holes pass through the protruding portion.

3. The combustor according to claim 2, wherein each of the plurality of first through-holes decreases in inner diameter dimension from the upstream side toward the downstream side.

4. The combustor according to claim 2, wherein each of the plurality of first through-holes increases in inner diameter dimension from the upstream side toward the downstream side.

5. A gas turbine comprising:
a plurality of the combustors according to claim 1, wherein the plurality of combustors are connected to each other via the connecting pipe.

6. The combustor according to claim 1, wherein the plurality of first through-holes extend toward the notch portion.

7. The combustor according to claim 1, wherein the purge air introduction hole further comprises a plurality of second through-holes which are formed in a direction intersecting the axial direction of the combustor.

8. The combustor according to claim 7, wherein the notch portion includes an arcuate portion with an arcuate shape, and linear portions with a rectilinear shape that extend from the arcuate portion towards a downstream edge of the combustor basket,
the plurality of first through-holes, which are formed along the axial direction of the combustor, are formed in the arcuate portion, and
the plurality of second through-holes, which are formed in the direction intersecting the axial direction, are formed in the linear portions.

* * * * *